United States Patent
Barbolini et al.

(10) Patent No.: US 10,641,195 B2
(45) Date of Patent: May 5, 2020

(54) METHOD FOR CONTROLLING THE OPERATION OF A TWO-STROKE SPARK IGNITION INTERNAL COMBUSTION ENGINE

(71) Applicant: EMAK S.P.A., Bagnolo In Piano (RE) (IT)

(72) Inventors: Gianluca Barbolini, Modena (IT);
Vincenzo Gagliardi, Modena (IT);
Alessandro Grisendi, Modena (IT)

(73) Assignee: EMAK S.P.A., Bagnolo in Piano (RE) (IT)

( * ) Notice: Subject to any disclaimer, the term of this patent is extended or adjusted under 35 U.S.C. 154(b) by 0 days.

(21) Appl. No.: 16/321,874

(22) PCT Filed: Jul. 20, 2017

(86) PCT No.: PCT/IB2017/054390
§ 371 (c)(1),
(2) Date: Jan. 30, 2019

(87) PCT Pub. No.: WO2018/025112
PCT Pub. Date: Feb. 8, 2018

(65) Prior Publication Data
US 2019/0178185 A1    Jun. 13, 2019

(30) Foreign Application Priority Data

Aug. 1, 2016   (IT) .......................... 102016000080647

(51) Int. Cl.
| | | |
|---|---|---|
| *F02P 5/15* | (2006.01) |
| *F02P 9/00* | (2006.01) |
| *F02P 11/00* | (2006.01) |
| *F02D 41/12* | (2006.01) |
| *F02D 35/02* | (2006.01) |
| *F02P 17/12* | (2006.01) |
| *F02B 75/02* | (2006.01) |

(52) U.S. Cl.
CPC ......... *F02D 41/123* (2013.01); *F02D 35/021* (2013.01); *F02P 5/1504* (2013.01);
(Continued)

(58) Field of Classification Search
CPC ..... F02D 2009/0208; F02D 2009/0238; F02D 2700/09; F02P 5/1504; F02P 9/0025; F02P 11/025
(Continued)

(56) References Cited

U.S. PATENT DOCUMENTS 4,336,778 A * 6/1982 Howard ................. B60K 28/00
123/198 D
4,625,689 A * 12/1986 Komurasaki ........... F02P 9/005
123/198 DC (Continued)

FOREIGN PATENT DOCUMENTS

DE    102008064008 A1    7/2009
WO    2007010957 A1    1/2007

*Primary Examiner* — Erick R Solis
(74) *Attorney, Agent, or Firm* — Volpe and Koenig, P.C.

(57) ABSTRACT

A method for controlling the operation of a spark ignition internal combustion engine is described. The engine includes: a combustion chamber, an intake duct for placing the combustion chamber in communication with the external, a throttle valve arranged inside the intake duct, a carburetor for introducing fuel into the intake duct to form an air/fuel mixture to be intaken into the combustion chamber, and a spark plug arranged inside the combustion chamber to generate a spark for igniting the combustion of the air/fuel mixture. The method includes: monitoring the opening degree of the throttle valve; monitoring the speed of the engine, preventing the spark plug from generating the spark, if the opening degree of the throttle valve drops below a first opening degree threshold value and the speed of the engine is greater than a first engine speed threshold value.

9 Claims, 3 Drawing Sheets

(52) U.S. Cl.
CPC ........... *F02P 5/1506* (2013.01); *F02P 5/1508* (2013.01); *F02P 9/005* (2013.01); *F02B 2075/025* (2013.01); *F02P 2017/125* (2013.01); *Y02T 10/46* (2013.01)

(58) Field of Classification Search
USPC ........... 123/198 DC, 329, 334, 335; 701/104
See application file for complete search history.

(56) References Cited

U.S. PATENT DOCUMENTS

| | | | | |
|---|---|---|---|---|
| 4,938,189 A * | 7/1990 | Morita | .................. | F02B 61/045 123/198 DC |
| 7,191,758 B2 * | 3/2007 | Umezu | .................. | F02D 17/04 123/198 D |
| 7,406,948 B2 * | 8/2008 | Hirowatari | ............ | F02D 11/105 123/480 |
| 7,699,039 B2 * | 4/2010 | Carlsson | ................ | F02P 9/005 123/406.53 |
| 8,469,001 B2 * | 6/2013 | Yoshizaki | ............... | F02D 11/04 123/198 DC |
| 9,726,095 B2 * | 8/2017 | Yoshizaki | ............... | F02B 63/02 |
| 2004/0035390 A1 * | 2/2004 | Nonaka | ................. | F02D 31/007 123/339.19 |
| 2009/0178648 A1 * | 7/2009 | Gegg | ...................... | F02D 37/02 123/406.45 |
| 2015/0184595 A1 * | 7/2015 | Honzawa | ................. | F02B 63/02 123/41.58 |
| 2015/0315982 A1 * | 11/2015 | Koenen | ................... | F02D 11/10 123/350 |

* cited by examiner

METHOD FOR CONTROLLING THE OPERATION OF A TWO-STROKE SPARK IGNITION INTERNAL COMBUSTION ENGINE

FIELD OF THE INVENTION

The present invention concerns a method for managing a store and the corresponding management apparatus.

In particular, the present invention concerns a method for managing a store of food products or other types of products having an expiry date, such as for example consumables for printers, medicines, paints, oils or other, typically in the domestic field, small communities, or businesses such as hotels, campsites or other. The method according to the present invention allows to manage data on the products such as type and quantity of products in the store and corresponding expiry dates.

BACKGROUND OF THE INVENTION

Methods for managing small stores are known, such as for example food stores for the household, family or small communities. These methods provide to use a data acquisition and processing device, such as for example a tablet or smartphone. In a first step, or insertion in the store or acquisition step, the data corresponding to the products that are progressively stored are entered into the memory of the processing device. In the acquisition step, the type, the quantity of the products stored and the place where the products are stored, for example in a refrigerator or one or more cupboards, are therefore memorized, and the relative expiry date is entered. The data are entered manually, so that for each type of product the relative expiry date is entered as presented on the packaging of the product itself, or on its label.

The method also provides a step of unloading from the store, where the products that are removed from the store to be used are eliminated from the memory of the data acquisition and processing device so that they are no longer available.

The method provides a signaling step in which, if the expiry date of one or more of the products stored in the store and memorized in the memory of the acquisition and processing device is near, a signal is generated regarding the imminent expiry of the one or more products. The signaling can be of various types, such as for example an acoustic alarm signal to display a notification that indicates the type of product expiring and the corresponding expiry date. In this way it is possible to prevent food waste related to the stocks of products whose preservation has exceeded the actual expiry date.

Thus, the airflow which flows along the Venturi pipe generates a vacuum which, through the dispensing nozzle, intakes the fuel from the containment chamber and mixes it with the air flowing towards the combustion chamber In conventional engines, the members of the carburettor are dimensioned so that the mixture has an air/fuel ratio that is always constant and substantially equivalent to a pre-set calibration value (normally slightly lower than the stoichiometric ratio).

This calibration value is a value selected so to guarantee an ideal balancing between engine efficiency and pollutant emissions, when the engine is operating under standard atmospheric pressure and temperature conditions. However, a drawback of these two-stroke engines lies in the fact that, should the user activate a sudden movement from a full load operating condition (throttle valve fully or almost fully open) to a minimum load operating condition (throttle valve fully or almost fully shut), engine deceleration takes a long time to occur, thus deteriorating the way the engine responds to the user's controls.

SUMMARY OF THE INVENTION

In the light of the above, an object of the present invention is to overcome the aforementioned drawback of the prior art, by providing a method for controlling the engine capable of improving the way the engine responds to the user's controls.

A further object is that of attaining the aforementioned object through a solution that is simple, rational and least expensive possible.

These and other objects are attained by the characteristics of the invention, which are outlined in the independent claims. The dependent claims outline preferred and/or particularly advantageous aspects of the invention.

In particular, an embodiment of the present invention provides a method for controlling the operation of a spark ignition internal combustion engine, wherein the engine comprises:
  a combustion chamber
  an intake duct suitable to place the combustion chamber in communication with the external,
  a throttle valve arranged in the intake duct,
  a carburettor suitable to introduce fuel into the intake duct to form an air and fuel mixture intended to be intaken into the combustion chamber, and
  a spark plug arranged inside the combustion chamber to generate a spark suitable to ignite the combustion of the air and fuel mixture,
the method comprises the steps of:
  monitoring the opening degree of the throttle valve,
  monitoring the engine speed,
  preventing the spark plug from generating the spark, if the opening degree of the throttle valve drops below a first opening degree threshold value (for example a threshold value indicating the fact that the throttle valve is shut or almost shut) and the engine speed is greater than a first engine speed threshold value (typically a threshold value equivalent to minimum or close to minimum speed).

Thanks to this solution, it is possible to prevent the generation of a spark every time the throttle valve is brought to a position for shutting or almost shutting the intake duct. Preventing the generation of a spark allows preventing the ignition of the fuel in the combustion chamber and thus the engine continues operating solely due to the inertia of the rotating parts. Thus, the engine decelerates much faster with respect to the prior art, hence improving the type and time of response to the user's control.

According to an aspect of the invention, the method may also comprise the step of maintaining the engine speed (constant or almost-constant) at a pre-set target value, for example at the minimum speed, if the engine speed drops below the first engine speed threshold value.

Thanks to this solution, after the deceleration phase following the shutting or almost-shutting of the throttle valve, the engine may be advantageously maintained at minimum speed, i.e. re-started (by reactivating the spark) and maintained at a pre-set minimum speed (i.e. at a pre-set minimum crankshaft rotational speed).

According to an aspect of the invention, the engine speed can be maintained at the pre-set target value by adjusting the ratio between air and fuel in the mixture formed by the carburettor.

In particular, the air and fuel ratio in the mixture may be advantageously adjusted by means of a control system, for example a closed loop control system, configured to minimise the difference between the engine speed and the pre-set target value.

Another aspect of the invention provides for that the method may comprise the step of adjusting the instant when the spark plug generates the spark (i.e. the ignition timing) depending on the opening degree of the throttle valve and engine speed, if the opening degree of the throttle valve is comprised between a second and a third opening degree threshold value, wherein said second opening degree threshold value is lower than said third opening degree threshold value (for instance, the second threshold value may indicate the fact that the throttle valve is at least minimally open, while the third threshold value may indicate the fact that the throttle valve is fully or almost fully open).

Thanks to this solution, when the throttle valve is opened partly, for example to accelerate the engine or to maintain it at a medium load condition, it is advantageously possible to adjust the mixture ignition instant so as to obtain an optimum performance of the engine and/or a reduction of the pollutant emissions.

The instant when the spark plug generates the spark may be provided in output from a calibration map which receives the engine speed and opening degree of the throttle valve in input.

According to another aspect of the invention, the method may further comprise the steps of monitoring the ionisation current in the combustion chamber and using the ionisation current to adjust the ratio between air and fuel in the mixture formed by the carburettor, if the opening degree of the throttle valve exceeds said third opening degree threshold value.

Thanks to this solution, every time the throttle valve is brought to a position of full opening or almost-full opening of the intake duct, the amount of fuel may be advantageously adjusted so as to guarantee an optimal balancing between engine efficiency and pollutant emissions, even should the operating conditions of the engine (external pressure, external temperature etc.) change with respect to the standard design conditions.

In particular, the adjustment of the ratio between air and fuel in this step may comprise the following actions:
  running the engine with an air/fuel ratio equivalent to a predetermined initial value;
  for the initial air/fuel ratio value, creating a first curve representing the ionisation current depending on the angular position of an engine crankshaft;
  calculating a value equivalent to the integral of the first curve in a pre-set angular interval of the crankshaft;
  modifying the engine air/fuel ratio bringing it to a second value different from the initial value;
  for the second air/fuel ratio value, creating a second curve representing the ionisation current depending on the angular position of the crankshaft;
  calculating a value equivalent to the integral of the second curve in an angular interval of the crankshaft equal to the previous one;
  calculating a difference between the value of the integral of the second curve and the value of the integral of the first curve;
  acting on the carburation by varying the initial value of the air/fuel ratio if the difference reveals an absolute value greater than a pre-set threshold value.

Basically, this control provides for performing an efficiency test: if the difference between the two values of the integral of the ionisation current reveals an absolute value lower or equal to the threshold value, this means that the initial value of the air/fuel ratio allows obtaining a good compromise between engine efficiency and the amount of pollutant emissions and thus the engine may continue being made to run with that initial value; on the other hand, should the difference between the two values of the integral of the ionisation current reveal an absolute value greater than the threshold value, this means that the initial value of the air/fuel ratio does not allow obtaining a good compromise between engine efficiency and the amount of pollutant emissions and thus the control will vary such initial value, making the engine run with a different amount of fuel with respect to the amount of air.

This efficiency test may be repeated several times, always using the value maintained constant or possibly adjusted at the end of the previous performance of the efficiency test, as the initial value of the air/fuel ratio, thus obtaining a continuous control of the engine air/fuel ratio which thus remains always comprised in a range of values that guarantee a good compromise between engine performance and the amount of pollutant emissions.

Another aspect of the invention provides for that the method may also comprise the step of reducing the engine speed, should the engine speed exceed a second engine speed threshold value which is greater than the first engine speed threshold value (for instance a speed value indicating the fact that the engine is over-revving).

Thanks to this solution, it is possible to introduce a safety function that prevents the engine speed (i.e. the rotational speed of the crankshafts) from reaching excessively high values, for example when the engine operates in full load mode and in conditions where the resistant torque is zero or almost zero.

The reduction of the engine speed may be obtained in this step by reducing the ratio between air and fuel in the mixture formed by the carburettor (typically by increasing the amount of fuel).

In particular, the ratio between air and fuel in the mixture formed by the carburettor may be reduced by means of a control system configured to increase the amount of fuel up to causing a reduction of the engine speed. Another embodiment of the present invention provides a spark ignition internal combustion engine comprising:
  a combustion chamber
  an intake duct suitable to place the combustion chamber in communication with the external,
  a throttle valve arranged in the intake duct,
  a carburettor suitable to introduce fuel into the intake duct to form an air and fuel mixture intended to be intaken into the combustion chamber,
  a spark plug arranged inside the combustion chamber to generate a spark suitable to ignite the combustion of the air and fuel mixture, and
  an electronic unit configured to monitor the opening degree of the throttle valve, monitor the engine speed and prevent the spark plug from generating the spark, if the opening degree of the throttle valve drops below a first opening degree threshold value and the engine speed is greater than a first engine speed threshold value.

This solution substantially attains the same advantages mentioned previously with reference to the control method, in particular the one that quickens the deceleration of the engine when the throttle valve is brought to a position of shutting or almost shutting the intake duct.

Obviously, the engine electronic unit may also implement all the other aspects of the control method.

For example, the electronic unit may be further configured to maintain the engine speed at a pre-set target value, for example at the minimum speed, if the engine speed drops below the first engine speed threshold value.

In particular, the electronic unit may maintain the engine speed at the target value by adjusting the air and fuel ratio in the mixture formed by the carburettor, for example by means of a control system, such as a closed loop control system, configured to minimise the difference between the engine speed and the pre-set target value.

In addition, the electronic unit may be configured to adjust the instant when the spark plug generates the spark (i.e. the ignition timing) depending on the opening degree of the throttle valve and the engine speed, if the opening degree of the throttle valve is comprised between a second and a third opening degree threshold value, wherein said second opening degree threshold value is below said third opening degree threshold value.

The instant when the spark plug generates the spark may be provided in output from a calibration map which receives the engine speed and opening degree of the throttle valve in input.

The electronic unit may be further configured to monitor the ionisation current in the combustion chamber and use the ionisation current to adjust the ratio between air and fuel in the mixture formed by the carburettor, if the opening degree of the throttle valve exceeds said third opening degree threshold value.

In particular, the electronic unit may be configured to perform such adjustment through the following actions:
  running the engine with an air/fuel ratio equivalent to a predetermined initial value;
  for the initial air/fuel ratio value, creating a first curve representing the ionisation current depending on the angular position of an engine crankshaft;
  calculating a value equivalent to the integral of the first curve in a pre-set angular interval of the crankshaft;
  modifying the engine air/fuel ratio bringing it to a second value different from the initial value;
  for the second air/fuel ratio value, creating a second curve representing the ionisation current depending on the angular position of the crankshaft;
  calculating a value equivalent to the integral of the second curve in an angular interval of the crankshaft equal to the previous one;
  calculating a difference between the value of the integral of the second curve and the value of the integral of the first curve;
  acting on the carburation by varying the initial value of the air/fuel ratio if the difference reveals an absolute value greater than a pre-set threshold value.

According to the invention, the electronic unit may be configured to reduce the engine speed if the engine speed exceeds a second engine speed threshold value that is greater than the first engine speed threshold value.

The reduction of the engine speed may be obtained by reducing the ratio between air and fuel in the mixture formed by the carburettor, for example by means of a control system configured to increase the amount of fuel up to causing a reduction of the engine speed.

It should be observed that in all cases mentioned above, the ratio between air and fuel in the mixture formed by the carburettor can be adjusted by varying the opening and shutting times of a valve arranged to shut off a duct which places the dispensing nozzle of the carburettor in communication with a chamber for containing the fuel.

BRIEF DESCRIPTION OF THE DRAWINGS

Further characteristics and advantages of the invention will be apparent from reading the flowing description—provided by way of non-limiting example—with reference to the figures illustrated in the attached drawings.

DETAILED DESCRIPTION

Figure 1:
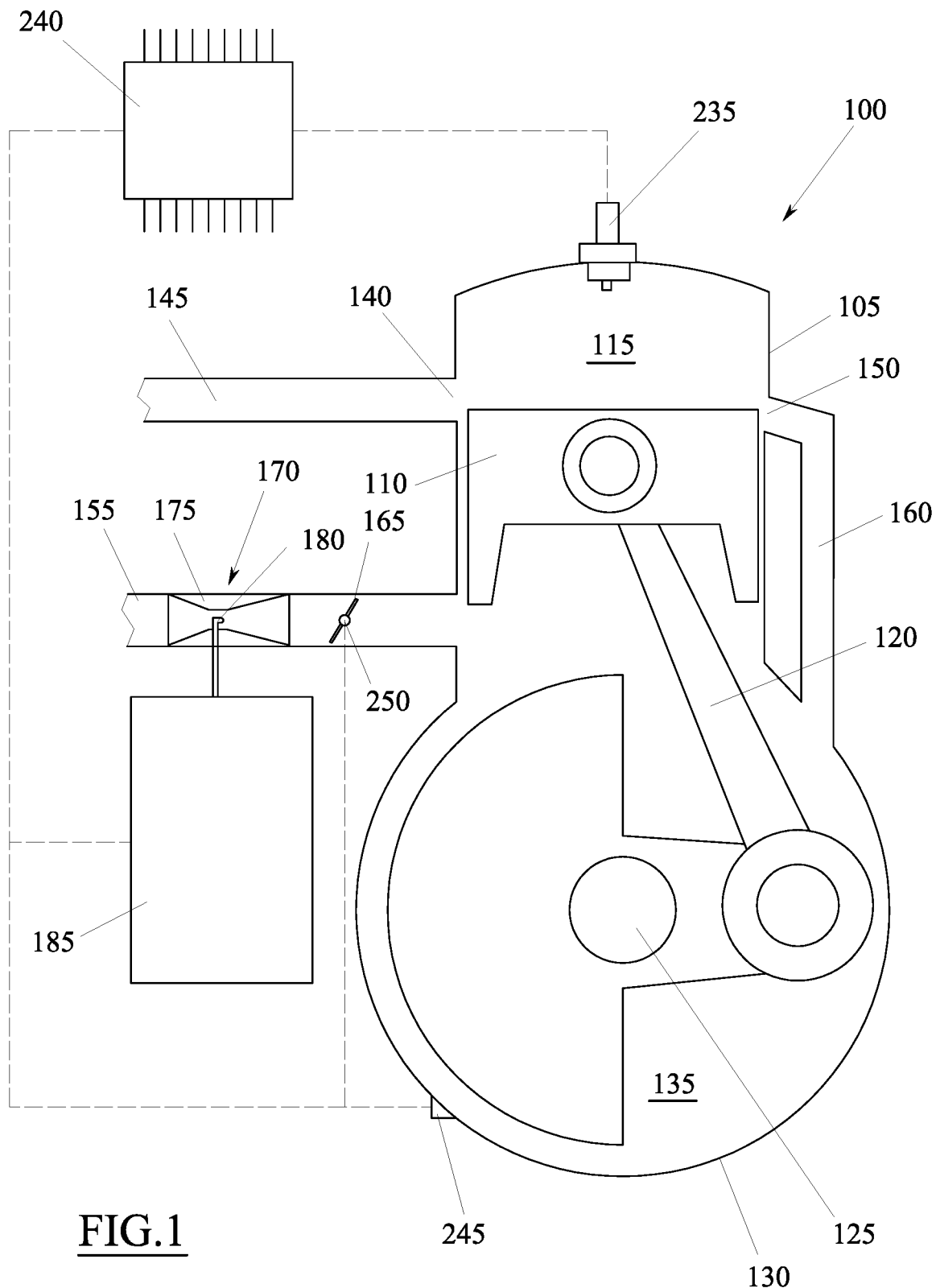
FIG. 1 is a diagram of a two-stroke spark ignition internal combustion engine.

FIG. 1 shows an internal combustion engine 100, in particular a two-stroke spark ignition internal combustion engine, of the type that can be used for operating small portable work equipment such as for example chainsaws, string trimmers and the like.

The engine 100 generally comprises a cylinder 105 in which there is slidably received a piston 110, which defines a combustion chamber 115 in the cylinder 105.

The piston 110 is connected—by means of a connecting rod 120—to a crankshaft 125, thus defining a crank gear system therewith, capable of transforming the reciprocating motion of the piston 110 into a rotation of the crankshaft 125 and vice versa.

The crankshaft 125 is contained in a crankcase 130, whose inner volume 135 is separated from the combustion chamber 115 by the piston 110, using suitable sealing rings (not illustrated).

The cylinder 105 comprises an exhaust opening 140 suitable to place the combustion chamber 115 in communication with an exhaust duct 145 terminating in the external environment.

In addition, the cylinder 105 comprises an intake opening 150 suitable to place the combustion chamber 115 in communication with an intake duct 155 also communicating with the external environment.

In particular, the intake duct 155 may terminate in the interior volume 135 of the crankcase 130 and be in communication with the intake opening 150 through a scavenging duct 160, which connects the interior volume 135 of the crankcase 130 with the intake opening 150.

A throttle valve 165, typically a butterfly valve, may be arranged in the intake duct 155 to adjust the air flow rate.

In particular, the throttle valve 165 may be displaced and stopped in any position between a position for the maximum shutting of the intake duct 155, in which the section for the flow of air is minimum (zero at most), and a position for the maximum opening of the intake duct 155, in which the section for the flow of air is maximum (at most coinciding with the section of the intake duct 155).

The position of the throttle valve 165 may be expressed in terms of its opening degree, thus a 0% opening degree indicates that the throttle valve 165 is in the position of maximum shutting of the intake duct 155, while a 100% opening degree indicates that the throttle valve 165 is in the position of maximum opening of the intake duct 155.

The activation and maintenance of the throttle valve 165 in the various positions may be carried out manually by the user of the engine 100, for example by means of an accelerator member, such as a lever, a knob or a pedal, which can be connected to the throttle valve 165 mechanically and/or electronically.

The engine further comprises a carburettor 170 suitable to introduce fuel into the intake duct 155 so as to form an air and fuel mixture intended to be intaken into the combustion chamber 115.

The carburettor 170 comprises a Venturi pipe 175 arranged to define a portion of the intake duct 155, typically upstream of the throttle valve 165. Thus, the airflow that flows through the Venturi pipe 175 is suitable to generate a localised vacuum inside the intake duct 155 (due to the Venturi effect).

The carburettor 170 also comprises a dispensing nozzle 180, which is in communication with a fuel source 185 and it is arranged at the area of the Venturi pipe 175 where vacuum is generated, generally at the central portion with narrowed section.

In this manner, the vacuum generated by the Venturi pipe 175 draws fuel from the fuel source 185 and introduces it into the intake duct 155 through the dispensing nozzle 180, mixing it with the airflow flowing towards the combustion chamber 115.

Figure 2:
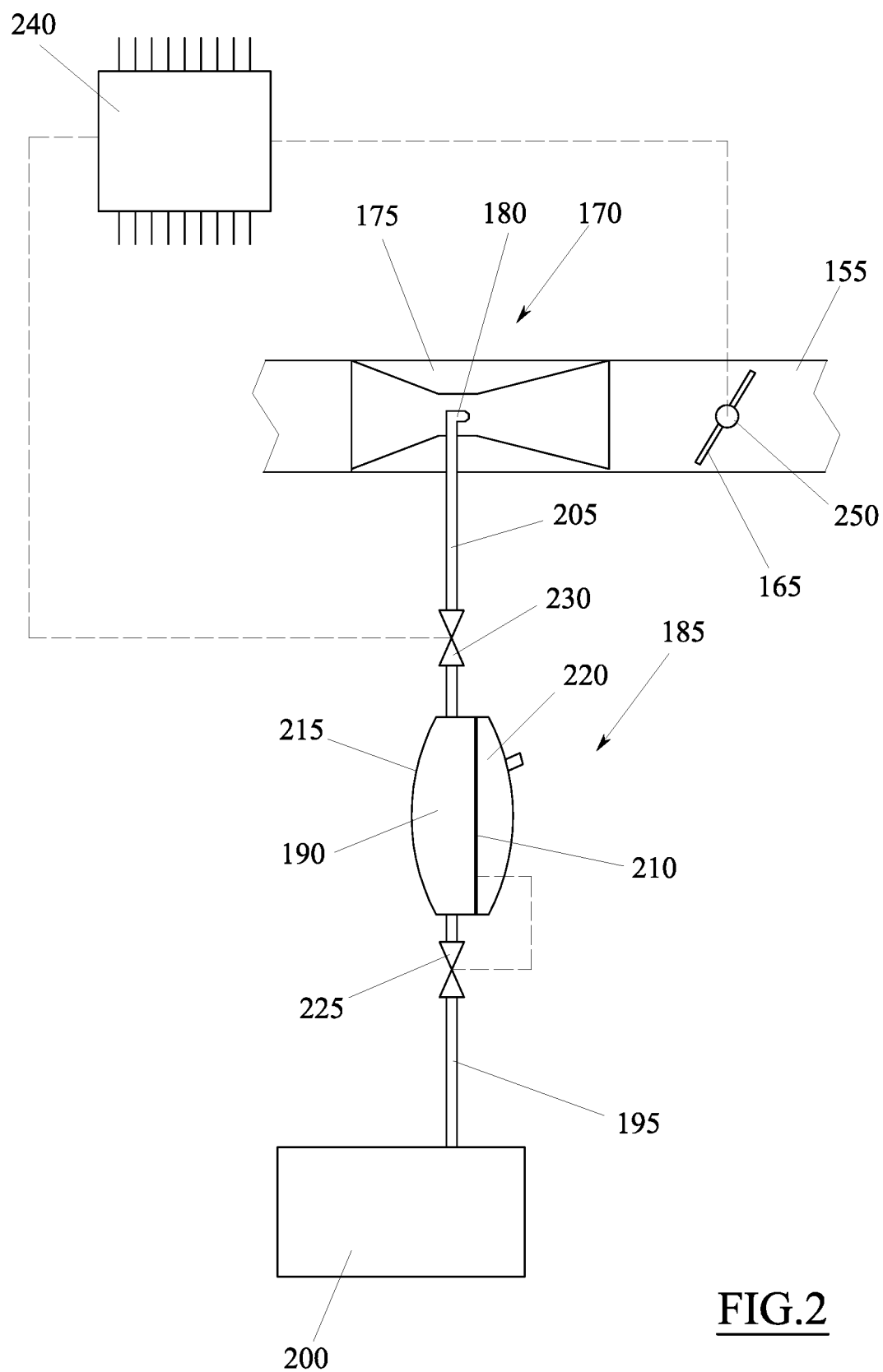
FIG. 2 is the diagram of a carburettor of the engine of FIG. 1.

According to the embodiment illustrated in FIG. 2, the fuel source 185 may comprise an accumulation chamber 190 comprising an intake duct 195 in communication with a fuel tank 200 and a delivery duct 205 in communication with the dispensing nozzle 180.

The accumulation chamber 190 may be at least partly defined by a flexible membrane 210, which divides the interior volume of a hollow casing 215 into two different chambers, in which a first chamber is the aforementioned accumulation chamber 190, while the second chamber 220 is placed in communication with the external environment.

The flexible membrane 210 is mechanically connected to a valve 225, which is suitable to open and shut the intake duct 195 by way of response to the oscillations of the flexible membrane 210.

In particular, when the fuel exits from the accumulation chamber 190 towards the dispensing nozzle 180, the flexible membrane 210 is deformed, due to the atmospheric pressure present in the second chamber 220, in the direction of reducing the volume of the accumulation chamber 190.

In this configuration, the flexible membrane 210 causes the opening of the valve 225, enabling the intake of additional fuel from the tank 200 to compensate for the fuel introduced into the intake duct 155.

The introduction of this new fuel into the accumulation chamber 190 simultaneously causes the deformation of the flexible membrane 210 in the direction opposite to the previous one, in the direction of reducing the volume of the second chamber 220, causing the shutting of the valve 225.

A balance condition which maintains the accumulation chamber 190 filled with fuel, regardless of the orientation taken by the carburettor 170 during use, is substantially attained thanks to this continuous oscillation of the flexible membrane 210.

In order to enable an adjustment of the amount of fuel introduced into the intake duct 155, which is independent from the pressure generated by the Venturi pipe 175, the carburettor 170 may comprise a valve 230 positioned along the delivery duct 205 connecting the accumulation chamber 190 with the dispensing nozzle 180.

In some embodiments, the valve 230 is an ON-OFF valve which can be controlled in a shutting position, in which it fully shuts the delivery duct 205, and an opening position, in which it leaves the delivery duct 205 fully open. When the valve 230 is in the opening position, the amount of fuel introduced into the intake duct 155 is maximum and solely depends on the vacuum generated by the Venturi pipe 175. On the other hand, when the valve 230 is in shutting position, the amount of fuel introduced into the intake duct 155 is always zero.

When the engine is running, the valve 230 may be controlled to open and shut cyclically, so as to globally introduce—into the intake duct 155—a non-zero amount of fuel but still below the defined maximum value of the vacuum generated by the Venturi pipe 175.

Suitably adjusting the ratio between the opening time and the shutting time of the valve 230 over a pre-set period of time, the amount of fuel globally introduced into the intake duct 155 may thus be adjusted regardless of the vacuum generated by the Venturi pipe 175.

Given that the vacuum generated by the Venturi pipe 175 depends on the flow rate that flows through it, it is clear that this type of adjustment advantageously enables modifying the ratio between air and fuel in the mixture formed by the carburettor 170.

It should be observed that the valve 230 may be electrically controlled, for example by means of a PWM signal, and that the adjustment may be obtained by varying the duty cycle of this PWM signal.

Returning to FIG. 1, the engine 100 further comprises a spark plug 235, which is associated to the cylinder 105 and it is suitable to cyclically generate a spark in the combustion chamber 115, so as to ignite the combustion of the air and fuel mixture.

Generally, the spark plug 235 is controlled to generate the spark every time the piston 110 is in proximity of the top dead centre thereof, i.e. in proximity of the position based on which the volume of the combustion chamber 115 is minimum.

Normally, the position of the piston 110 is indicated according to the angular position of the crankshaft 125, assuming the angular position of the crankshaft 125, corresponding to the top dead centre of the piston 110, to be angle 0°.

The spark plug 235 is generally controlled to generate the spark with a few advance degrees with respect to the top dead centre of the piston 110, i.e. while the piston 110 is still moving in the direction of reducing the volume of the combustion chamber 115.

Upon generating the spark, the combustion of the air and fuel mixture produces exhaust gases in rapid expansion which push the piston 110 to slide inside the cylinder 105 from the top dead centre towards the bottom dead centre, i.e. towards the position based on which the volume of the combustion chamber 115 is maximum.

During this downward stroke, the piston 110 opens the exhaust opening 140 first, so as to allow the exhaust gases to flow out towards the external environment, then it opens the intake opening 150 to allow the inflow a new load of air and fuel mixture into the combustion chamber 115.

In particular, the new mixture load is introduced into the combustion chamber 115 through the scavenging duct 160, due to the movement of the piston 110 which, sliding towards the bottom dead centre, shuts the intake duct 155 first, and then pumps the mixture which is contained in the crankcase 130 towards the combustion chamber 115.

Upon reaching the bottom dead centre, the piston 110 starts an upward stroke towards the top dead centre, opening the intake duct 155 once again and thus enabling the intake of a new air and fuel mixture into the crankcase 130.

Simultaneously, during this upward stroke, the piston 110 first shuts the intake opening 150 and the exhaust opening 140 and then progressively reduces the volume of the combustion chamber 115, compressing the air and fuel mixture contained therein.

When the piston 110 is in proximity of the top dead centre once again, the spark plug 235 is controlled to generate another spark and the cycle is repeated.

The running of the engine 100 may be controlled by an electronic unit 240 in communication with one or more sensors and/or devices associated to the engine 100.

In particular, the electronic unit 240 may receive input signals coming from the various sensors configured to generate signals proportionally to various physical parameters associated with the engine 100.

These sensors may include a sensor 245 for detecting the speed of the engine 100, i.e. a sensor suitable to detect the rotational speed of the crankshaft 125 (for example expressing it in terms of revolutions per minute—Rpm), and a sensor 250 for detecting the position i.e. the opening degree of the throttle valve 165 for example expressing it in terms of percentages).

The electronic unit 240 may also transmit output signals to various devices which affect the running of the engine 100, including the spark plug 235 which determines the combustion timing and the valve 230 which determines the ratio between air and fuel in the mixture.

Figure 3:
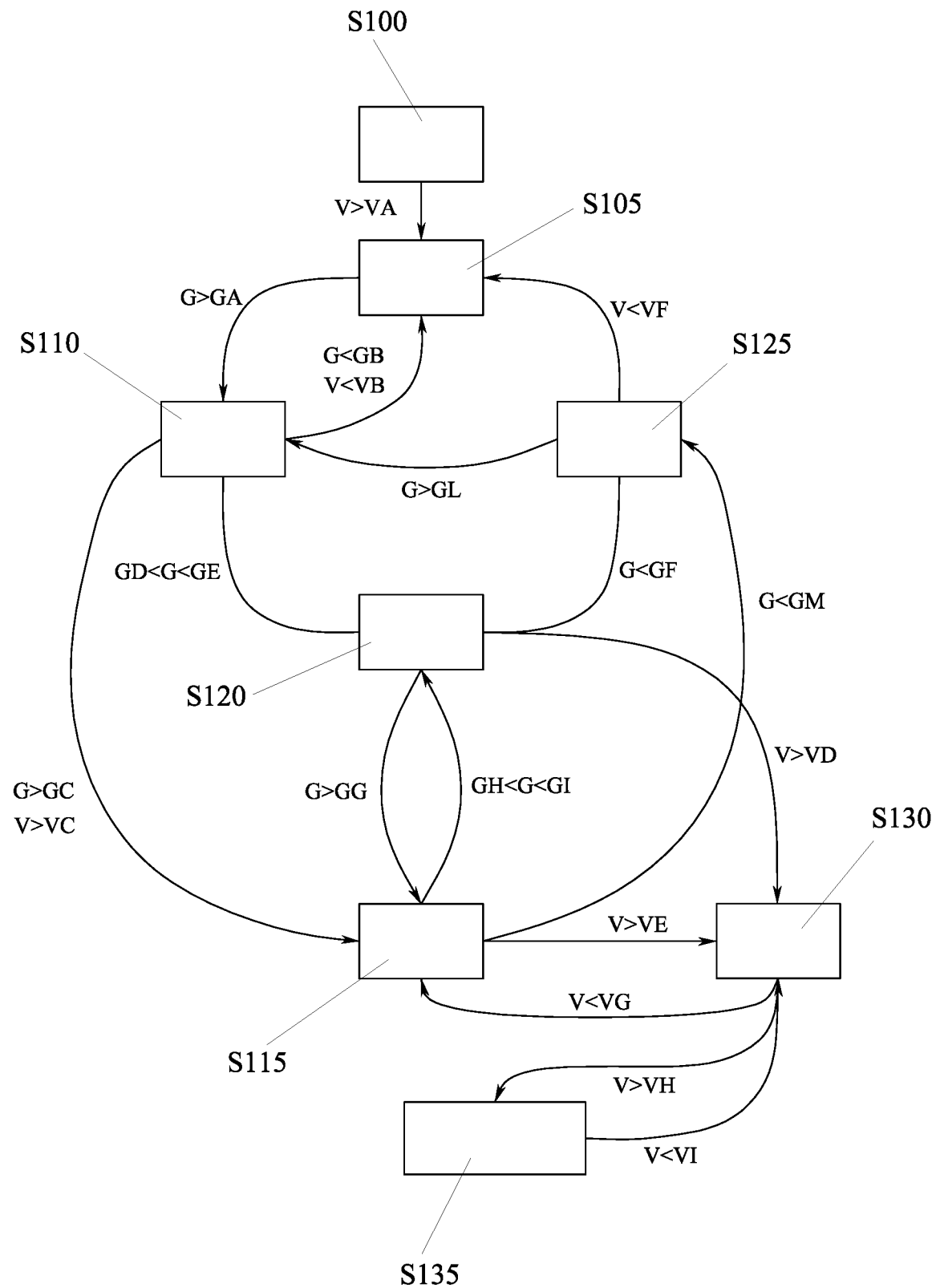
FIG. 3 is a diagram of a state machine used for controlling the operation of the engine of FIG. 1.

According to the present treatise, the electronic unit 240 may be configured to control the running of the engine 100 by means of a state machine like the one represented in FIG. 3.

The state machine comprises a plurality of control procedures (states) which are selectively and alternatively carried out by the electronic unit 240, passing from one to the other according to suitable criteria to be outlined hereinafter.

In the context of the present treatise, "passing" from one control procedure to another is used to indicate that the execution of the first control procedure is interrupted and that the execution of another control procedure is activated immediately thereafter.

Above all, the state machine comprises a starting procedure S100, which is activated only upon starting the engine 100.

The engine 100 may be started by means of an electric starter or, more commonly in this type of applications, by means of a manual rope system. The starting procedure S100 provides for that the electronic unit 240 controls the spark plug 235 to generate the spark with the sole aim of starting the engine 100, while there is no particular carburation control i.e. controlling the ratio between air and fuel in the mixture, which is thus simply set at pre-set calibration values.

The starting procedure S100 provides for that the electronic unit 240 monitors the speed V of the engine 100, i.e. the rotational speed of the crankshaft 125.

When the speed V of the engine 100 exceeds a pre-set threshold value VA, the electronic unit 240 passes from the starting procedure S100 to a procedure for managing the minimum S105.

The threshold value VA of the speed V of the engine 100 is generally a rather low value, which can be equal or slightly different with respect to the minimum speed of the engine 100.

The minimum speed can be defined as the minimum speed that the engine 100 must maintain to overcome the frictions of the rotating parts.

The threshold value VA of the speed V of the engine 100 may for example be equivalent to about 2900 Rpm.

The procedure for managing the minimum S105 provides for that the electronic unit 240 maintains the speed V of the engine 100 constant (or almost constant) at a pre-set target value, typically at the minimum speed or at a value very close to the minimum speed.

The value of the target speed V of the engine may for example be comprised between 2900 Rpm and 3600 Rpm.

In order to maintain the speed V of the engine 100 at the pre-set target value, the procedure for managing the minimum S105 may provide for that the electronic unit 240 suitably adjusts the ratio between air and fuel in the mixture formed by the carburettor 170.

For example, the electronic unit 240 may perform a closed loop control cycle which provides for measuring the speed V of the engine 100, calculating the difference between the measured speed V and the target value and providing this difference—in input—to a controller, for example a proportional (P), proportional integral (PI) or proportional-integral-derivative (PID) controller, whose output modifies the air/fuel ratio so as to minimise the aforementioned difference.

The output of the controller can be a signal capable of modifying the ratio between the opening and shutting times of the valve 230 over a pre-set period of time, such as for example the duty cycle of the PWM signal which controls the valve 230.

Simultaneously, the procedure for managing the minimum S105 provides for that the electronic unit 240 monitors the position of the throttle valve 165, i.e. its opening degree G, and compares it with a pre-set threshold value GA. The threshold value GA may be a value above which the user is requesting the engine 100 to accelerate.

The threshold value GA may be equivalent to about 6% for example.

If the opening degree G of the throttle valve 165 exceeds the threshold value GA, the electronic unit 240 passes from the procedure for managing the minimum S105 to a procedure for managing accelerations S110.

The procedure for managing accelerations S110 provides for that the electronic unit 240 maintains the air/fuel ratio substantially constant at a pre-set value, for example maintaining the ratio between the times for opening and shutting the valve 230 constant.

This pre-set value of the air/fuel ratio may be a calibration value possibly corrected when running the engine 100 at full load as described hereinafter. The procedure for managing accelerations S110 may also provide for that the electronic unit 240 continues monitoring the speed V of the engine 100 and the opening degree G of the throttle valve 165, and that it adjusts the instant when the spark plug 235 generates the spark (i.e. the spark advance with respect to the top dead centre of the piston 110) according to these two operating parameters.

Generally speaking, it is provided for that the electronic unit 240 increases the spark advance (for example from −28° to)−31° progressively as the opening degree G of the throttle valve 165 and/or the speed V of the engine 100 increase, and vice versa.

Practically, the advance value may be provided in output from a calibration map which receives the engine speed V and opening degree G of the throttle valve 165 in input.

Simultaneously, the procedure for managing accelerations S110 provides for that the electronic unit 240 compares the opening degree G of the throttle valve 165 with a pre-set threshold value GB and the value of the speed V of the engine 100 with a pre-set threshold value VB.

The threshold value GB is a value beneath which the throttle valve 165 is substantially shut, while the threshold value VB is a value beneath which the engine 100 is substantially at minimum.

The threshold value GB may be equal or lower than the threshold value GA or approximately equivalent to 3%, while the threshold value VB may be equal to or greater than the target value used in the procedure for managing the minimum S105 or approximately equivalent to 3600 Rpm.

If the opening degree G of the throttle valve 165 drops below the threshold value GB or if the value of the speed V of the engine 100 drops below the threshold value VB, the electronic unit 240 passes from the procedure for managing accelerations S110 to the procedure for managing the minimum S105 once again.

The procedure for managing accelerations S110 provides for that the electronic unit 240 compares the opening degree G of the throttle valve 165 with a pre-set threshold value GC and the value of the speed V of the engine 100 with a pre-set threshold value VC.

The threshold value GC is a value indicating that the engine 100 is running with the throttle valve 165 almost fully open, while the threshold value VC is a value indicating that the engine 100 is close to the admissible maximum revolution regime.

The threshold value GC may be considerably greater than the threshold value GA or approximately equivalent to 70%, while the threshold value VC may be considerably greater than the target value used in the procedure for managing the minimum S105, approximately equivalent to 6000 Rpm for example.

If the opening degree G of the throttle valve 165 exceeds the threshold value GC or if the value of the speed V of the engine 100 exceeds the threshold value VC, the electronic unit 240 passes from the procedure for managing accelerations S110 to a procedure for managing full load S115.

Lastly, the procedure for managing accelerations S110 provides for that the electronic unit 240 compares the opening degree G of the throttle valve 165 even with other two pre-set threshold values GD and GE between which the throttle valve 165 is partly open.

The threshold value GD may be comprised between the threshold value GA and the threshold value GC, for example it may be approximately equivalent to 15%, while the threshold value GE is greater than the threshold value GD and it may be equal or lower than the threshold value GC, for example approximately equivalent to 65%.

If the opening degree G of the throttle valve 165 reaches a value comprised between the threshold values GD and GE, the electronic unit 240 passes from the procedure for managing the accelerations S110 to a procedure for managing medium loads S120.

The procedure for managing medium loads S120 provides for controlling the ignition advance in the same manner as the procedure for managing accelerations S110, i.e. depending on the speed V of the engine 100 and the opening degree G of the throttle valve 165 as explained previously.

As regards carburation instead, the procedure for managing medium loads S120 simply provides for increasing the air/fuel ratio with respect to the one used in the procedure for managing accelerations S110 so as to avert misfire phenomena.

Simultaneously, the procedure for managing medium loads S120 provides for that the electronic unit 240 compares the opening degree G of the throttle valve 165 with a pre-set threshold value GF.

The threshold value GF may be a value beneath which the throttle valve 165 is deemed almost shut, which means that the user is requesting the engine 100 to decelerate.

For example, the threshold value GF may substantially be equal to the threshold value GA or it may substantially be equivalent to 6%.

If the opening degree G of the throttle valve 165 drops below the threshold value GF, the electronic unit 240 passes from the procedure for managing the medium loads S120 to a procedure for managing decelerations S125. The procedure for managing medium loads S120 also provides for that the electronic unit 240 compares the speed V of the engine 100 with a pre-set threshold value VD.

The threshold value VD may be an admissible maximum value beyond which the engine 100 could potentially over-rev.

For example, the threshold value VD could be greater than the threshold value VC or substantially equivalent to 9300 Rpm.

If the speed V of the engine exceeds the threshold value VD, the electronic unit 240 passes from the procedure for managing medium loads S120 to a procedure for managing limit conditions S130.

Lastly, the procedure for managing medium loads S120 provides for comparing the opening degree of the throttle valve 165 even with a pre-set threshold value GG.

The threshold value GG is a value indicating that the throttle valve 165 is fully or almost fully open.

For example, the threshold value GG may substantially be equal to the threshold value GC or substantially equivalent to 70%.

If the opening degree of the throttle valve 165 exceeds the threshold value GG, the electronic unit 240 passes from the procedure for managing the medium loads S120 to the aforementioned procedure for managing the full load S115.

The procedure for managing the full load S115 may provide for that the electronic unit monitors the ionisation current in the combustion chamber 115 and that it uses the ionisation current for adjusting the ratio between air and fuel in the mixture formed by the carburettor 170.

The ionisation phenomenon occurs inside the combustion chamber 115, where ions are generated due to the oxidation reaction of the fuel and due to the action of the heat generated by the combustion.

In the presence of differently charged poles arranged in the combustion chamber 115, between the poles there occurs a migration of ions causing a passage of current called ionisation current $C_i$.

The electrodes of the spark plug 235 of the fuel mixture can be used as poles.

The ionisation current $C_i$ is the current that flows between the two electrodes, measured from outside the engine 100, i.e. through the electric circuit of the spark plug 235.

Current measurement systems a are known and thus will not be described in detail.

The electronic unit 240 may be configured for monitoring the ionisation current a as a function of the rotation angle of the crankshaft 125 at each engine cycle $c_i=f(\alpha)$] and for calculating—at each engine cycle—a parameter z that expresses the integral value from 0° to 360° of the curve $C_i=f(\alpha)$, i.e. of the ionisation current in that engine cycle.

During the procedure for managing full load S115, the electronic unit 240 may perform an efficiency test that firstly provides for controlling the valve 230 so that the engine 100 runs at a predetermined initial value $\lambda 0$ of the air/fuel ratio.

This initial value $\lambda_0$ of the air/fuel ratio may be a calibration value, for example the one that guarantees the best compromise between engine efficiency and pollutant emissions in standard operating conditions, or it may be the most recent value obtained during a previous execution of the procedure for managing full load S115.

For this initial value $\lambda_0$, the curve $[c_i = f(\alpha)]$ is created and the integral $z_0$ is calculated from 0° to 360° of the curve $c_i = f(\alpha)$, i.e. the integral value of the ionisation current during the current engine cycle.

During the subsequent engine cycle, the air/fuel ratio is modified automatically and the value of the integral of the ionisation current is recalculated.

The change of the air/fuel ratio may be carried out by shutting off the feeding to the engine 100 for a few seconds, or rather for a few engine cycles, for example for three or more engine cycles.

Basically, the valve 230 of the carburettor 170 is maintained shut for the aforementioned time range, for example for three or more engine cycles so that the engine 100 is only fed with the amount of fuel left in the circuit, globally causing an increase of the air/fuel ratio.

This leads to the change of the air/fuel ratio from the initial value $\lambda_0$ to a different value $\lambda_1$, always greater than $\lambda_0$, to which there corresponds the calculation of a new value $z_1$ of the integral of the ionisation current in the engine cycle.

Comparing the values $z_0$ and $z_1$ allows calculating the difference $\Delta_z = z_1 - z_0$ and if the absolute value difference is greater than a given reference value $\Delta_{zrif}$ this means that the carburation is not correct and thus should be changed. 30 For example, the reference value $\Delta_{zrif}$ may be equivalent to 8.32 $\mu A*rad$, thus the difference between the two values $z_0$ and $z_1$ of the integral is acceptable only if lower than said reference value ($\Delta_z < 8.32$ $\mu A*rad$).

In particular, if the absolute value of $\Delta_z$ is $<\Delta zrif$ the carburation is deemed to be correct. In this case, the electronic unit 240 controls the valve 230 so that, in the subsequent engine cycles, the engine 100 resumes running with the initial value $\lambda_0$ of the air/fuel ratio, without acting on the carburation.

If the absolute value of $\Delta_z$ is $>\Delta_{zrif}$ and $\Delta_z$ is a negative value, this means that the air/fuel mixture is too lean. In this case, the electronic unit 240 controls the valve 230 so as to enrich the air/fuel mixture for example by a fixed amount. In other words, the electronic unit 240 controls the valve 230 so that, in the subsequent engine cycles, the engine is made to run with a greater amount of fuel with respect to the one corresponding to the initial value $\lambda_0$, i.e. with a new value of the air/fuel ratio which is lower than the value $\lambda_0$.

Vice versa, if the absolute value of $\Delta_z > \Delta_{zrif}$ and $\Delta_z$ is a positive value, this means that the air/fuel mixture is too rich. In this case, the electronic unit 240 controls the valve 230 so as to lean the air/fuel mixture for example by a fixed amount. In other words, the electronic unit 240 controls the valve 230 so that, in the subsequent engine cycles, the engine is made to run with a lower amount of fuel with respect to the one corresponding to the initial value $\lambda_0$, i.e. with a new value of the air/fuel ratio which is greater than the initial value $\lambda_0$. This new value of the air/fuel ratio could coincide with the value $\lambda_1$ but it could also be different.

This efficiency test is repeated several times during the execution of the procedure for managing the full load S115, always using the value at which the engine was running immediately before—i.e. the value observed (maintaining constant or adjusted) at the end of the most recent efficiency test carried out previously—as the initial value $\lambda_0$ of the air/fuel ratio.

In particular, the efficiency test may be repeated at regular intervals, for example every 15-20 seconds, so that the carburation is continuously adapted and maintained in proximity of an optimal value of the air/fuel ratio as a function of the use conditions and environmental operating conditions of the engine 100.

The value of the air/fuel ratio obtained at the end of the most recent efficiency test carried out before exiting from the procedure for managing full load S115 may be memorised, and subsequently used as the pre-set value of the air/fuel ratio in the procedures for managing accelerations S110 and managing the minimum S105.

Simultaneously, the procedure for managing the full load S115 provides for that the electronic unit 240 continues monitoring the opening degree G of the throttle valve 165 and the speed V of the engine 100.

The opening degree G of the throttle valve 165 is compared with two pre-set threshold values GH and GI, between which the throttle valve 165 is partly open.

The threshold value GH may be greater than the threshold value GA and lower than the threshold value GC, for example it may be substantially equivalent to the threshold value GD or approximately equivalent to 15%, while the threshold value GI is greater than the threshold value GH and it can be equal or lower than the threshold value GC, for example it can be substantially equal to the threshold value GE or approximately equivalent to 65%.

If the opening degree G of the throttle valve 165 reaches a value comprised between the threshold value GH and the threshold value GI, the electronic unit 240 passes from the procedure for managing the full load S115 to the procedure for managing medium loads S120 once again.

The procedure for managing the full load S115 also provides for that the electronic unit 240 compares the speed V of the engine with a pre-set threshold value VE.

The threshold value VE may be an admissible maximum value beyond which the engine 100 could potentially over-rev.

For example, the threshold value VE of the speed of the engine 100 may be substantially equal to the threshold value VD or substantially equivalent to 9300 Rpm.

If the speed V of the engine exceeds the threshold value VE, the electronic unit 240 passes from the procedure for managing the full load S115 to the aforementioned procedure for managing the limit conditions S130.

Lastly, the procedure for managing the full load S115 provides for that the electronic unit 240 compares the opening degree G of the throttle valve 165 with a pre-set threshold value GM.

The threshold value GM may be a value beneath which the throttle valve 165 is deemed almost shut, which means that the user is requesting the engine 100 to decelerate rapidly.

For example, the threshold value GM may be equal or slightly greater than the threshold value GF and lower than the threshold value GC, for example substantially equal to the threshold value GD or substantially equivalent to 15%.

If the opening degree G of the throttle valve 165 drops below the threshold value GM, the electronic unit 240 passes from the procedure for managing the full load S115 to the aforementioned procedure for managing decelerations S125.

The procedure for managing decelerations S125 provides for that the electronic unit 240 prevents the spark plug 235 from generating the spark, for example for all engine cycles in which the procedure for managing decelerations S125 remains active.

In other words, in this step the electronic unit 240 controls the spark plug 235 so that it does not generate a spark.

Thus, even should a minimum amount of air and fuel mixture be intaken into the combustion chamber 115, it would not be burnt and thus no torque would be transmitted to the crankshaft 125.

Thanks to this solution, the procedure for managing decelerations S125 generates a quick deceleration of the engine speed 100, given that the crankshaft 125 is solely subjected to brake torques due to the frictions and the pumping effects of the pistons 120, thus improving the dynamics thereof and quickening the response thereof upon releasing the accelerator.

As regards carburation, the procedure for managing decelerations S125 may simultaneously provide for that the electronic unit controls and maintains the valve 230 in shutting position, so as to prevent small amounts of fuel from being introduced into the intake duct 155 and thus released to the exhaust system unburnt.

The procedure for managing decelerations S125 also provides for constantly monitoring the speed V of the engine 100 and the opening degree G of the throttle valve 165.

In particular, the procedure for managing decelerations S125 provides for that the electronic unit 240 compares the speed V of the engine 100 with a pre-set threshold value VF.

The threshold value VF is a value beneath which the engine 100 is running in the minimum area.

For example, the threshold value VF could be substantially equivalent to the threshold value VB or substantially equivalent to 3600 Rpm.

If the speed V of the engine 100 drops below the threshold value VF, the electronic unit 240 passes from the procedure for managing decelerations S125 to the procedure for managing the minimum S105.

In addition, the procedure for managing decelerations S125 provides for that the electronic unit 240 compares the opening degree G of the throttle valve 165 with a pre-set threshold value GL.

The threshold value GL may be greater than the threshold value GM and lower than the threshold value GC, for example it may be substantially equivalent to 20%.

On the other hand, if the opening degree G of the throttle valve 165 exceeds the threshold value GM, the electronic unit 240 passes from the procedure for managing decelerations S125 to a procedure for managing accelerations S110.

Now, returning to the procedure for managing limit conditions S130, this procedure may provide for that the electronic unit 240 maintains the air/fuel ratio constant at a pre-set value. This air/fuel ratio may be the most recent value obtained during the procedure for managing the full load S115 or it may be a calibration value, for example a safety value that does not set the engine 100 in the maximum efficiency conditions and which should thus cause a reduction of the speed V.

In any case, during the procedure for managing limit conditions S130 the electronic unit 240 never performs the carburation efficiency test provided for by the procedure for managing the full load S115 and thus it does not adjust the fuel/air/fuel ratio. The reason behind this lies in the fact that the test may no longer be meaningful above a given rotational regime.

Simultaneously, the procedure for managing limit conditions S130 provides for that the electronic unit 240 continues monitoring the speed V of the engine 100 and compares it with a pre-set threshold value VG lower than the threshold value VE.

The threshold value VG may for example be lower than the threshold value VE by a pre-set amount that may be approximately equivalent to 300 Rpm. If the speed V of the engine 100 drops below the threshold value VG, the electronic unit 240 may pass from the procedure for managing limit conditions S130 to the procedure for managing the full load S115 once again. The procedure for managing limit conditions S130 also provides for that the electronic unit 240 compares the speed V of the engine 100 with a pre-set threshold value VH.

The threshold value VH may be greater than the threshold value VE, for example approximately equivalent to 9600 Rpm.

If the speed V of the engine 100 exceeds the threshold value VH, the electronic unit 240 may pass from the procedure for managing limit conditions S130 to a procedure for limiting speed S135.

The procedure for limiting speed S135 may provide for that the electronic unit 240 actively causes a reduction of the speed V of the engine 100.

In order to actively reduce the speed V of the engine 100, the procedure for limiting the speed S135 may provide for that the electronic unit 240 suitably reduces the ratio between air and fuel in the mixture formed by the carburettor 170.

For example, the electronic unit 240 may perform a control cycle that provides for measuring the speed V of the engine and reducing the air/fuel ratio until the speed V of the engine 100 starts reducing.

The air/fuel ratio may be reduced by increasing the amount of fuel, for example increasing the ratio between the times for opening and shutting the valve 230 over a pre-set period of time, i.e. by increasing the duty cycle of the PWM signal that controls the valve 230.

The procedure for limiting the speed S135 provides for constantly monitoring the speed V of the engine 100 and comparing it with a pre-set threshold value VI lower than VH.

The threshold value VI may for example be lower than the threshold value VH by a pre-set amount that may be approximately equivalent to 300 Rpm. When the speed V of the engine 100 drops below the threshold value VI, the electronic unit 240 may pass from the procedure for limiting the speed S135 to the procedure for managing limit conditions S130 once again.

All threshold values mentioned in the description above are "predetermined" in the sense that they are design values determined at the programming stage, for example using suitable experimental tests, and stored in the storage system of the electronic unit 240. Each one of the threshold values mentioned in the description above can also be considered as a constant value, i.e. a value that does not change as a function of other parameters but remains the same during the engine operation.

Although it is clearly implied by the foregoing description, it is desirable to specify that, when referring to the speed V of the engine 100 and/or to the opening degree of the throttle valve 165, especially when they are compared or related with the corresponding threshold values, the description was referring to the speed values V of the engine 100 and/or to the opening degree G of the throttle valve 165 which are measured (monitored) by the respective sensors and thus acquired by the electronic unit 240.

Actually, the electronic unit 240 may include a central processing unit (CPU) in communication with a storage system and an interface bus. The CPU may be configured to execute stored instructions as a programme in the storage system, as well as send and receive signals to/from the interface bus. The storage system may include various types of storage means including the optical storage, magnetic storage, solid state storage, and any other non-volatile storage means. The interface bus may be configured to send, receive and modulate analogue signals and/or digital signals from/to various sensors and control devices. The programme may include instructions that enable the electronic unit 240 to execute the control methods described previously. Instead of the electronic unit 240, the engine 100 may be equipped with a different type of processor to execute the control methods, for example an embedded electronic system or any other concentrated or distributed processing module.

Obviously, the engine 100 and the relative control method may be subjected—by a man skilled in the art—to numerous technical/application modifications, without departing from the scope of protection of the invention as claimed below.

The invention claimed is:

1. A method for controlling the operation of a spark ignition internal combustion engine (100), wherein the engine (100) comprises:
   a combustion chamber (115),
   an intake duct (155) configured to place the combustion chamber (115) in communication with the external,
   a throttle valve (165) arranged in the intake duct (155),
   a carburetor (170) configured to introduce fuel into the intake duct (155) to form an air and fuel mixture intended to be intaken into the combustion chamber (115), and
   a spark plug (235) arranged inside the combustion chamber (115) to generate a spark for ignition of the combustion of the air and fuel mixture,
the method comprises the steps of:
   monitoring the opening degree (G) of the throttle valve (165),
   monitoring the speed (V) of the engine (100),
   preventing the spark plug (235) from generating the spark, if the opening degree (G) of the throttle valve (165) drops below a first opening degree threshold value (GM) and the speed (V) of the engine (100) is greater than a first engine speed threshold value (VF);
   adjusting the instant when the spark plug (235) triggers the spark depending on the opening degree (G) of the throttle valve (165) and the speed (V) of the engine (100), if the opening degree (G) of the throttle valve (165) is comprised between a second and a third opening degree threshold value (GA, GC), wherein said second threshold value (GA) is below said third opening degree threshold value (GC).

2. The method according to claim 1, further comprising the step of maintaining the speed (V) of the engine (100) at a pre-set target value, if the speed (V) of the engine (100) drops below the first engine speed threshold value (VF).

3. The method according to claim 2, wherein the speed (V) of the engine (100) is maintained at the pre-set target value by adjusting the ratio between air and fuel in the mixture formed by the carburetor (170).

4. The method according to claim 3, wherein the ratio between air and fuel in the mixture is adjusted by a control system configured to minimize a difference between the speed (V) of the engine (100) and the pre-set target value.

5. The method according to claim 1, wherein the instant when the spark plug (235) generates the spark may be provided in output from a calibration map which receives the speed (V) of the engine (100) and the opening (G) of the throttle valve (165) in input.

6. The method according to claim 1, further comprising the steps of monitoring the ionization current in the combustion chamber (115) and using the ionization current to adjust the ratio between air and fuel in the mixture formed by the carburetor (170), if the opening degree (G) of the throttle valve (165) exceeds said third opening degree threshold value (GC).

7. The method according to claim 6, wherein the adjustment of the ratio between air and fuel comprises:
   running the engine (100) with an air/fuel ratio equivalent to a predetermined initial value;
   creating, for the initial air/fuel ratio value, a first curve representing the ionization current depending on the angular position of an engine crankshaft (125);
   calculating a value equivalent to the integral of the first curve in a pre-set angular interval of the crankshaft (125);
   modifying the engine air/fuel ratio bringing it to a second value different from the initial value;
   for the second air/fuel ratio value, creating a second curve representing the ionization current depending on the angular position of the crankshaft (125);
   calculating a value equivalent to the integral of the second curve in an angular interval of the crankshaft (125) equal to the previous one;
   calculating a difference between the value of the integral of the second curve and the value of the integral of the first curve;
   acting on the carburation by varying the initial value of the air/fuel ratio if the difference reveals an absolute value greater than a pre-set threshold value.

8. The method according to claim 1, further comprising the steps of reducing the engine speed, if the engine speed (V) exceeds a second engine speed threshold value (VH) that is greater than the first engine speed threshold value (VF).

9. A spark ignition internal combustion engine (100) comprising:
   a combustion chamber (115),
   an intake duct (155) configured to place the combustion chamber (115) in communication with the external,
   a throttle valve (165) arranged in the intake duct (155),
   a carburetor (170) configured to introduce fuel into the intake duct (155) to form an air and fuel mixture intended to be intaken into the combustion chamber (115),
   a spark plug (235) arranged inside the combustion chamber (115) to generate a spark suitable to ignite the combustion of the air and fuel mixture, and
   an electronic unit (240) configured to monitor the opening degree (G) of the throttle valve (165), monitor the speed (V) of the engine (100) and prevent the spark plug (235) from generating the spark, if the opening degree (G) of the throttle valve (165) drops below a first opening degree threshold value (GM) and the speed (V) of the engine (100) is greater than a first engine speed threshold value (VF) and adjust the instant when the spark plug (235) triggers the spark depending on the opening degree (G) of the throttle valve (165) and the speed (V) of the engine (100), if the opening degree (G) of the throttle valve (165) is comprised between a second and a third opening degree threshold value (GA, GC), wherein said second threshold value (GA) is below said third opening degree threshold value (GC).

* * * * *